United States Patent [19]
Wallace

[11] Patent Number: 5,492,204
[45] Date of Patent: Feb. 20, 1996

[54] TRAILER BREAKAWAY DEVICE

[75] Inventor: Jeffrey D. Wallace, Des Moines, Iowa

[73] Assignee: Dico, Inc., Des Moines, Iowa

[21] Appl. No.: 215,724

[22] Filed: Mar. 22, 1994

[51] Int. Cl.⁶ .................................................. B60T 13/08
[52] U.S. Cl. ............................... 188/112 R; 280/446.1; 74/500.5
[58] Field of Search ..................... 188/1.11, 2 D, 188/112 R, 345, 151 A; 280/432, 446.1, 455.1, 511; 74/500.5

[56] References Cited

U.S. PATENT DOCUMENTS

| | | | |
|---|---|---|---|
| 3,180,454 | 4/1965 | DeAngelis et al. | 188/112 |
| 3,921,766 | 11/1975 | May | 188/167 |
| 4,223,766 | 9/1980 | Heutsch et al. | 188/112 R |
| 4,239,252 | 12/1980 | Heutsch et al. | 280/446 R |
| 4,306,734 | 12/1981 | Swanson et al. | 280/446 B |
| 4,352,505 | 10/1982 | Chambers | 280/495 |
| 5,013,059 | 5/1991 | Goettker | 280/446.1 |

*Primary Examiner*—Josie Ballato
*Attorney, Agent, or Firm*—Brian J. Laurenzo; Kent A. Herink; James R. Foley

[57] ABSTRACT

A trailer breakaway safety mechanism which brings a trailer to a controlled stop after disengagement with a pulling vehicle. The mechanism consists of a cable which remains attached to the trailer after the trailer has disengaged from the pulling vehicle. As the trailer slows in relationship to the pulling vehicle, the cable activates a breaking mechanism on the trailer. Once the breaking mechanism has been fully actuated, the hook which attaches the cable to the pulling vehicle fails thereby completely releasing the trailer from the pulling vehicle. Steel balls are swaged to the cables so that when the cable is released from the pulling vehicle, a spring lock can engage the balls and prevent the cable from retracting and releasing the actuated brake. After the trailer has come to a complete stop, a screwdriver or other tool may be inserted into the housing of a mechanism to push back the spring lock and release the steel balls which thereby allows the cable to release the trailer brake.

15 Claims, 3 Drawing Sheets

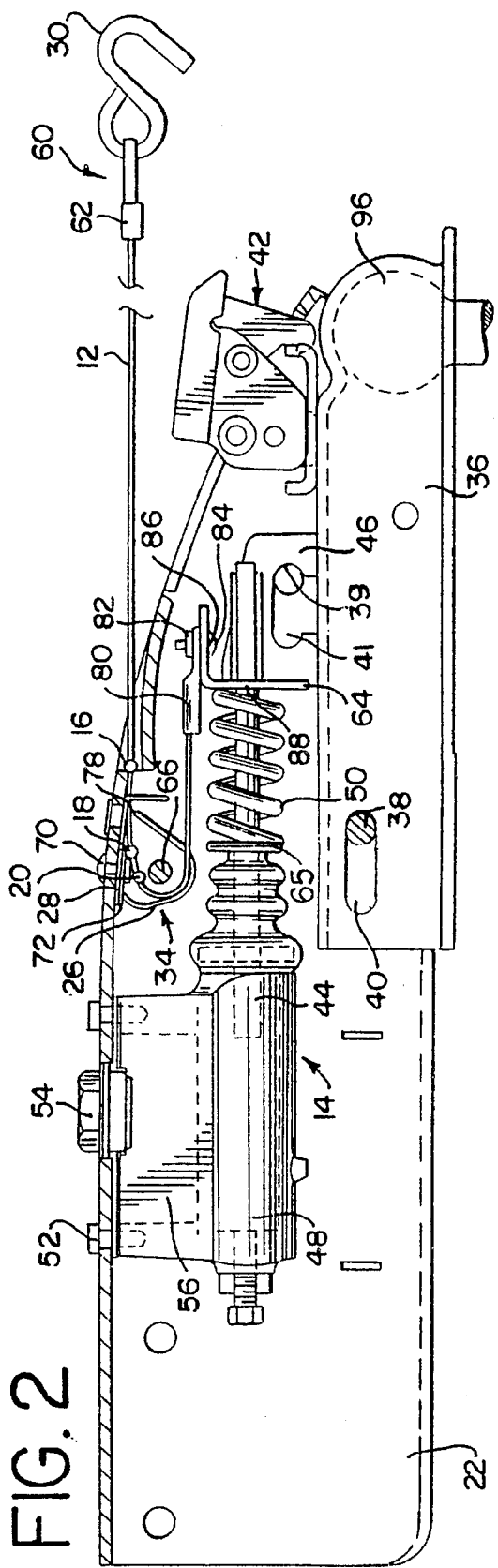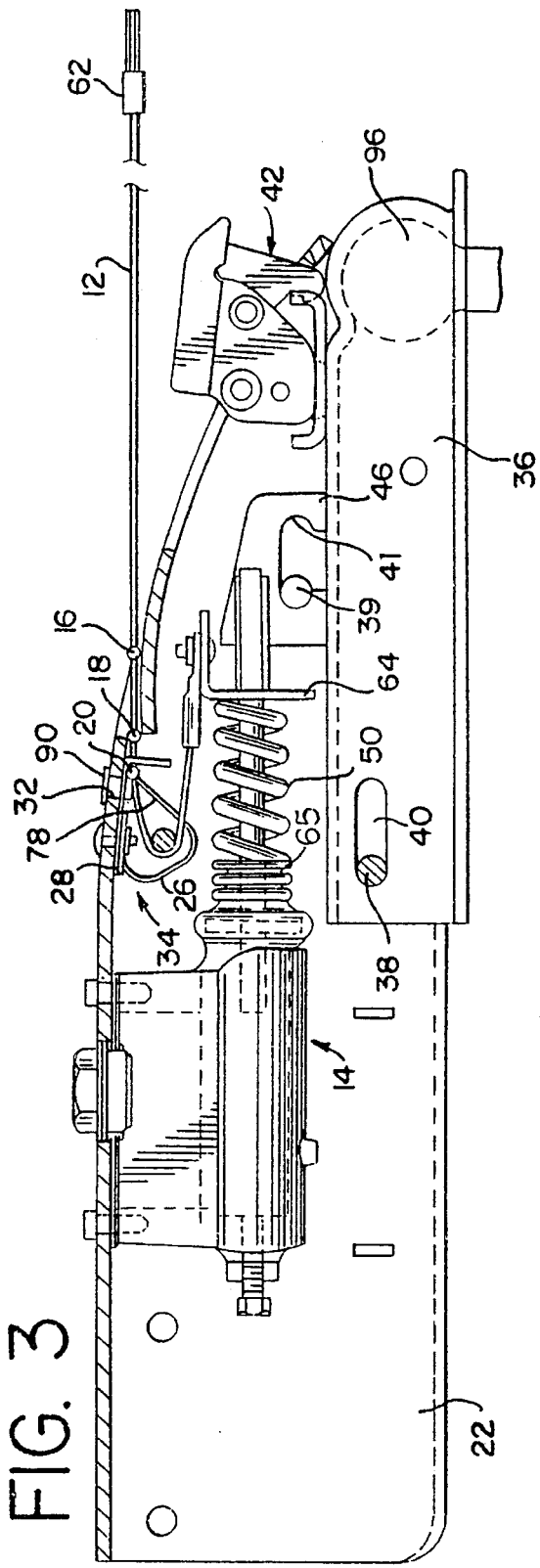

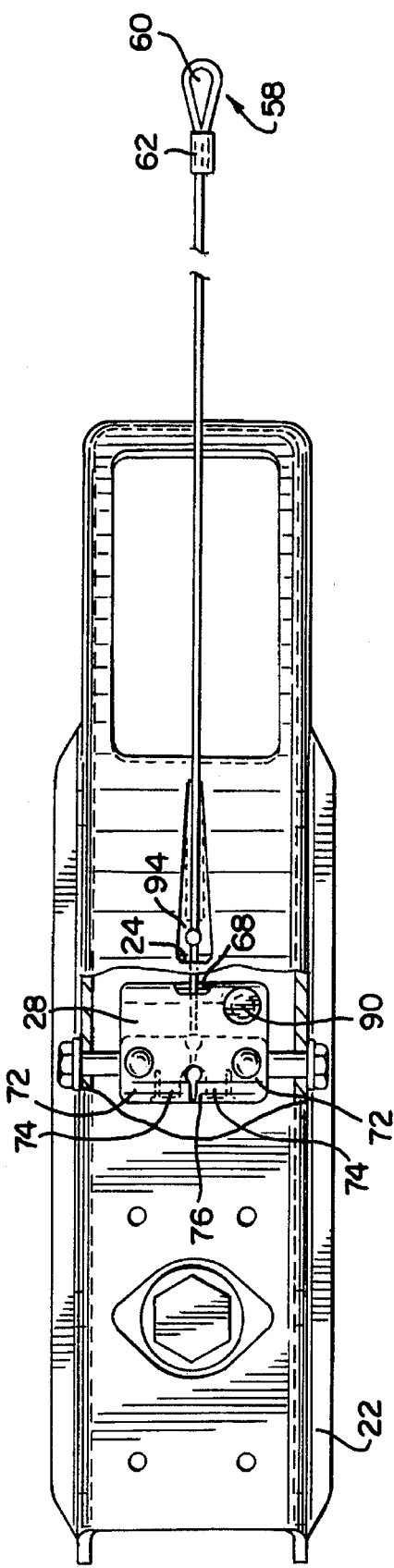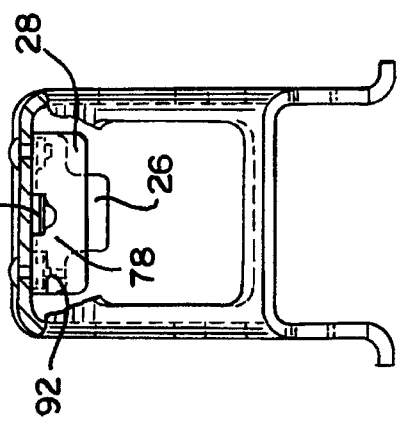

5,492,204

TRAILER BREAKAWAY DEVICE

BACKGROUND OF THE INVENTION

The present invention relates generally to trailer braking systems and, more particularly, to an apparatus for actuating a trailer brake when a trailer, mounted to a pulling vehicle, becomes detached from the pulling vehicle as the trailer is being pulled.

Trailer breakaway brake actuating mechanisms are known in the art. These mechanisms generally operate through a cable or chain, which is attached to a pulling vehicle by means of an S-hook or similar attachment device. The opposite end of the cable is operably connected to the trailer's braking system so that the trailer brake is actuated when the cable is pulled. When the trailer becomes detached from the pulling vehicle during operation, the trailer, no longer being pulled, tends to change position relative to the pulling vehicle. The S-hook, however, remains attached to the pulling vehicle. As the pulling vehicle pulls the cable, the cable actuates the trailer brake mechanism thereby stopping the trailer. As the trailer stops, the force on the cable increases until the S-hook straightens, fails, and releases the cable from the pulling vehicle. To maintain pressure on the cable and prevent the cable from releasing the trailer braking mechanism, a friction lock is generally used to prevent the cable from retracting and prematurely releasing the trailer brake. Although such mechanisms are generally adequate to stop a breakaway trailer in most circumstances, they do possess several inherent drawbacks.

Most prior art systems operate by means of a friction lock to prevent the extended cable from retracting. During connection and deconnection of the trailer to the pulling vehicle the cable is often pulled toward the pulling vehicle. Even a slight tug is often enough to actuate the breakaway mechanism slightly, or to cause dangerous slack in the cable when the friction lock prevents the cable from returning taught after connection to the pulling vehicle. Even though the brake mechanism may be actuated only somewhat, this slight activation can cause excessive wear on the trailer brake and an excessive burden on the pulling vehicle which decreases fuel mileage and increases maintenance costs. Over time this excessive burden could even cause the trailer brake to fail in an emergency situation due to premature lining wear or overheating.

Another problem with existing trailer breakaway brake actuators is that friction locks are generally provided on the surface of the trailer mount housing. While this surface mounting aids in deactivating the lock, the surface placement exposes the lock to the elements which may wear or even clog the braking mechanism thereby often rendering the mechanism ineffective and unsafe.

The difficulties encountered in the prior art discussed hereinabove are substantially eliminated by the present invention.

SUMMARY OF THE INVENTION

Accordingly, it is an object of the present invention to provide a simple and efficient brake locking device which is protected from premature wear by enclosure within a protective housing.

It is another object of the present invention to provide an enclosed brake locking device which can be easily released after activation.

Still another object of the present invention is to provide an enclosed brake locking device with an indicator mechanism outside of the housing to show at what stage of locking the brake locking device is engaged.

Yet another object of the present invention is to provide a brake locking device enclosed within an aesthetically appealing housing.

Another object of the present invention is to provide an enclosed brake locking device which is compact.

Still another object of the present invention is to provide an enclosed brake locking device which can be actuated from a plurality of angles relative to the device housing.

By the present invention, it is proposed to overcome the difficulties encountered heretofore. To this end, a braking mechanism is provided which activates a trailer brake when the trailer becomes detached from a pulling vehicle. The braking mechanism consists of a means for releasably connecting the pulling vehicle to a trailer brake. At least one flange is operably connected to the releasable connection means. A flange arrestment means is provided to allow the releasable connection means to pass across the flange arrestment means in both directions while allowing the flange to pass by in only a single direction. A means is provided to move the releasable connection means and flange across the flange arrestment means when the trailer moves away from the pulling vehicle. An operable connection between said releasable connection means and the said trailer brake is also provided so that as the trailer move away from the pulling vehicle, the trailer brake is actuated.

BRIEF DESCRIPTION OF THE DRAWINGS

FIG. 2 is a cross-sectional side elevation of the braking mechanism showing the cable in the non-actuation position;

FIG. 3 is a cross-sectional side elevation showing the cable in the brake actuation position;

FIG. 4 is a top plan cross sectional view of the braking mechanism showing the cable in the non-actuation position;

FIG. 5 is a front cross-sectional view of the braking mechanism showing the spring lock and guide plate.

DETAILED DESCRIPTION OF THE INVENTION

Figure 1:
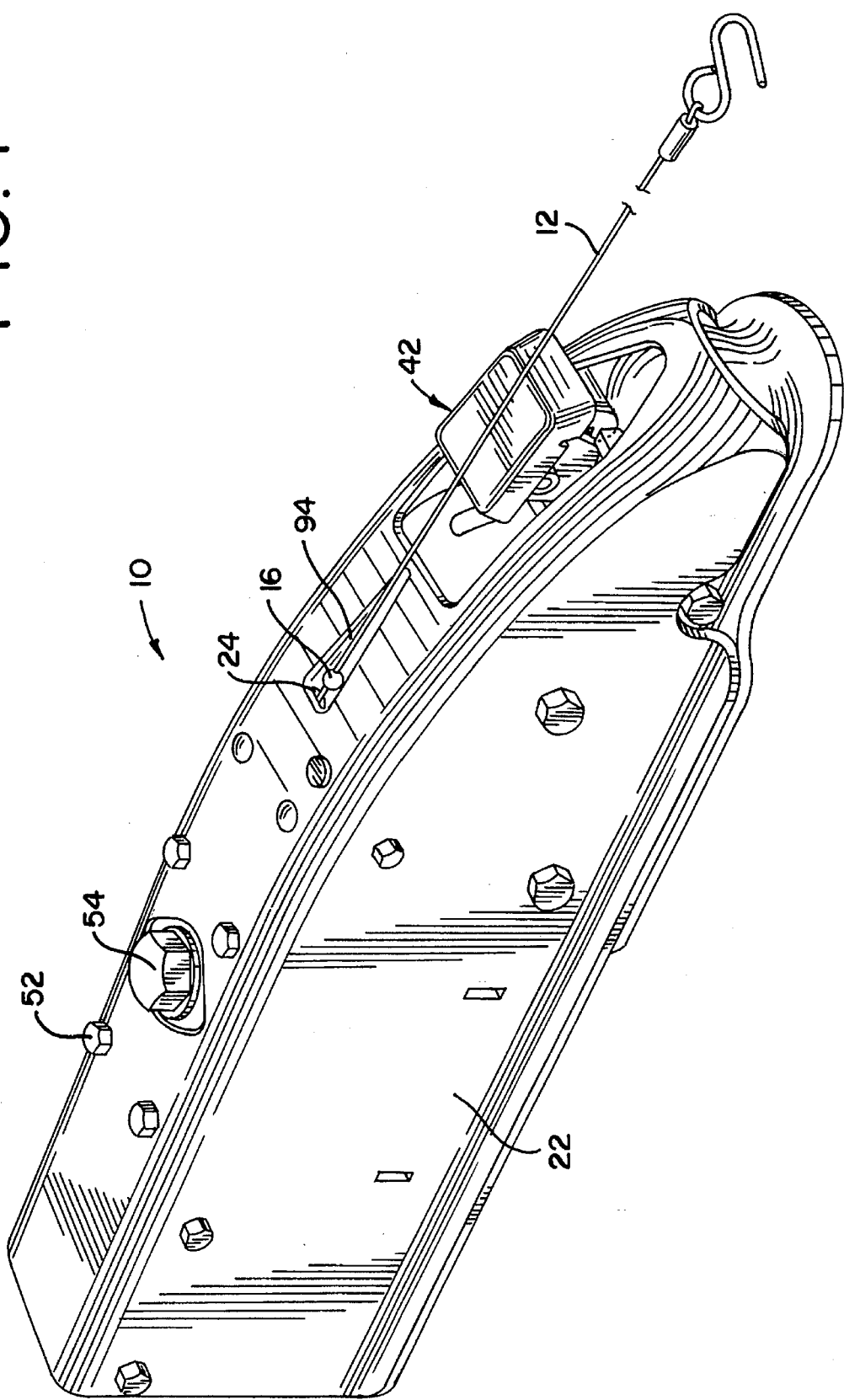
FIG. 1 is perspective view of the braking mechanism showing the cable in the non-brake actuation position.

The invention relates to a trailer breakaway mechanism 10 designed to apply a trailer's brakes when the trailer becomes detached from a trailer pulling vehicle. The breakaway mechanism 10 consists of a cable 12 which is attached at one end to a trailer braking system 14 and at the other end to the trailer pulling vehicle. Three metal balls 16, 18, and 20 are swaged through a diameter of the balls 16, 18, and 20 to the cable 12 near the trailer braking system 14. The entire braking system is enclosed within a housing 22 and the housing 22 is provided with an aperture 24 through which the cable 12 passes from the interior to the exterior of the housing 22. A spring lock 26 is mounted to the interior of the housing 22 as is a cable guide 28 which guides the cable 12 through the spring lock 26. The spring lock 26 is designed so that the cable 12 may pass back and forth across the lock 26, but the balls 18 and 20 cannot return back across the spring lock 26 once they have been pulled past the lock 26 toward the pulling vehicle.

The cable 12 is connected to the pulling vehicle by means of an S-hook 30. When the trailer becomes detached from the pulling vehicle the trailer moves away from the pulling vehicle. As the trailer moves away from the pulling vehicle, the pulling vehicle pulls the cable 12 which actuates the trailer braking system 14. The trailer begins to decelerate, thereby increasing the load on the cable 12. The increased load on the cable 12 causes the trailer braking mechanism 14 to become fully actuated. As the braking mechanism 14 becomes fully actuated, the cable 12 carries the steel balls 18 and 20 swaged thereto across the spring lock 26. As the cable load increases, the S-hook 30 bends and straightens, releasing from the pulling vehicle. When the breakaway mechanism 10 is actuated it exerts a force against the cable 12. This force pulls the end of the cable 12, which is attached to the S-hook 30, back toward the housing 22 as soon as the S-hook 30 fails and the cable 12 becomes detached from the pulling vehicle. The cable 12 is pulled toward the housing until the last trigger ball 20 to pass the spring lock 26 contacts the spring lock 26 and becomes trapped between the spring lock 26 and cable guide plate 28. Because the trigger ball 20 is swaged to the cable 12, the cable 12 is engaged as well. The trailer braking system 14 is thereby prevented from becoming deactivated. The trailer therefore comes to a safe stop until the pulling vehicle can return to pick up the disengaged trailer.

A spring lock bypass aperture 32 is provided in the housing 22 which can be uncovered and a tool inserted. The tool is used to release the spring lock 26 from the trigger ball 20, thereby returning the trailer braking system 14 to the nonactuation position. The trailer breakaway breakaway mechanism 10 is then again ready for operation.

In the figures, a breakaway mechanism 10 is shown including a housing 22, a trailer braking system 14, and a breakaway lock trigger assembly 34 (FIG. 2). In the preferred embodiment of the present invention, the housing 22 is constructed of steel and contains the trailer braking system 14 and the breakaway lock trigger assembly 34. The housing 22 not only affords the braking mechanism an aesthetically pleasing appearance, but also protects the braking system 14 from exposure to the elements and guides the cable 12 to the breakaway lock trigger assembly 34. In the preferred embodiment the braking system 14 is a hydraulic master cylinder which is operably connected to brakes on the trailer wheels (not shown). As a piston push rod 44 is moved into a master cylinder 48 hydraulic fluid is sent to the brakes, thereby applying them and slowing the trailer. The housing 22 is slidably connected to a ball-type hitch 36 by means of bolts 38 and 39 connected to both sides of the housing 22 and slidably mounted within slots 40 and 41 located on the ball-type hitch 36. The ball-type hitch 36 is secured to the pulling vehicle by means of a locking assembly 42 which prevents the hitch 36 from becoming accidently detached from the pulling vehicle as the trailer is being pulled.

The lower bolt 38 is slidably engaged directly to a slot 40 located on the hitch 36, while the upper bolt 39 is slidably engaged within a slot 41 located on a piston actuator 46. The slots 40 and 41 and bolts 38 and 39 are in slidable engagement with the housing 22 to add a surge actuation feature to the trailer breakaway mechanism 10. The hitch 36 is operably engaged to a piston push rod 44 of the master cylinder 48 by means of a piston actuator 46 so that as the pulling vehicle slows, so that the speed of the trailer becomes greater than the speed of the pulling vehicle, the inertia of the trailer pushes the housing 22 toward the hitch 36 as the bolts 38 and 39 slide along the slots 40 and 41. This movement of the housing 22 toward the hitch 36 causes the piston actuator 46, which is secured to the hitch 36, to move the piston push rod 44 into the master cylinder 48. The braking system 14 is thereby actuated and the trailer is slowed.

Once the trailer has slowed down to the pulling vehicle speed or the pulling vehicle has sped up to the trailer speed, the hitch 36 moves away from the housing 22 thereby allowing the piston push rod 44 and piston actuator 46 to move away from the trailer braking system 14 and release the trailer brakes (FIG. 3). In the preferred embodiment, an overload spring 50 is mounted between the master cylinder 48 and the piston actuator 46 to limit the system's hydraulic pressure.

As shown in FIG. 2 the master cylinder 48 is secured to the housing 22 by means of bolts 52. A master cylinder fill cap 54 is fitted into an aperture in the housing unit 22 to protect brake fluid within a reservoir 56 from becoming contaminated with dirt or other elements. The fill cap 54 is located on the extension of the housing 22 so that the master cylinder fluid reservoir 56 can be examined quickly and the brake fluid level in the master cylinder 48 maintained.

The breakaway lock trigger mechanism 34 is a compact apparatus consisting of a cable 12, at least one flange operably connected to the cable 12, and a flange arrestment means (FIG. 2). In the preferred embodiment, the flange is in the form of a metal ball 20 swaged to the cable 12 and the flange arrestment means is in the form of a spring lock 26. As shown in FIG. 4, the pulling vehicle attachment end 58 of the cable 12 is formed into a loop 60 and secured to itself by means of a crimp connector 62. An S-hook 30 is connected through the loop 60 of the cable 12 (FIG. 2). The end of the S-hook 30 which passes through the loop 60 is bent until the curved end touches the main body of the S-hook 30 to prevent the S-hook 30 from accidently slipping off of the cable 12 (FIG. 2). The other end of the S-hook 30 is left in an open curve so that the hook 30 may be releasably attached to the pulling vehicle. An aperture 24 is provided in the housing 22 so that the cable 12 may enter the housing 22 and eventually connect to a brake actuation plate 64 (FIG. 2). The aperture 24 is preferably of an arcuate configuration so that as the breakaway mechanism 10 is actuated from a plurality of angles neither the cable 12 nor the balls 16, 18, and 20 snag on the corners of the aperture. In the preferred embodiment, after passing through the aperture 24, the cable 12 passes through a flange guide such as a cable guide plate 28 which is secured to the housing 22 (FIG. 4).

As shown in FIG. 2 the cable guide plate 28 consists of a generally L-shaped metal bracket. An aperture 68 is located along the angular edge of the cable guide plate 28 (FIG. 5). The aperture 68 is wide enough to allow the cable 12 and swaged balls 18 and 20 to pass back and forth through the aperture 68, yet small enough to guide the cable 12 and balls 16, 18, and 20 into the spring lock 26 located directly behind the cable guide plate 28 (FIGS. 2 and 4). As shown in FIG. 2, the cable guide plate 28 is secured between the spring lock 26 and housing 22 by means of bolts 70.

In the preferred embodiment, the spring lock 26 is provided with recoil means to return the spring lock 26 to its original position. Preferably, the spring lock 26 is stamped from 22 gauge spring grade stainless steel, but may, of course, be constructed of any durable spring-like material. The side of the spring lock 26 which is mounted to the housing 22 divides into two pairs of fingers, an outer pair 72 and an inner pair 74 (FIG. 4). The inner pair of fingers 74 extend downward and away from the pulling vehicle. The outer pair of fingers 72 extend away from the pulling vehicle and flat against the housing 22 to brace and support the spring lock 26 (FIG. 2). The inner pair of fingers 74 curve around a bolt 66 upon which the cable 12 turns. The inner pair of fingers 74 are spaced far enough apart to create a slot 76 through which the cable 12 may pass (FIG. 4). The catch end 78 of the spring lock 26 widens into a solid plate of metal as wide as the cable guide 28 (FIG. 5). The catch end 78 of the spring lock 26 is forced against the underside of the cable guide plate 28 by the spring action of the curved portion of the spring lock 26 (FIG. 2).

In the preferred embodiment, the catch end 78 of the spring lock 26 engages the cable guide 28 at an angle of less than 90 degrees and preferably 30 degrees so that as the cable 12 and balls 18 and 20 move toward the pulling vehicle, the catch end 78 of the spring lock 26 may be pushed away from the inner plate of the cable guide plate 28 to allow the cable 12 and balls 18 and 20 to pass. As the cable 12 begins to move back toward the trailer, however, the catch end 78 of the spring lock 26 allows only the cable to pass through the spring lock 28. The flanges, which are in the preferred embodiment comprised by balls 18 and 20 are engaged by the spring lock 26 and prevented from passing back across the spring lock 26 until the spring lock 26 has been released. Because of the acute angle formed between the catch end 78 of the spring lock 26 and the cable guide 28, the more the cable 12 is pulled toward the interior of the housing 22, the more the balls 18 and 20 press the catch end 78 of the spring lock 26 into the cable guide 12.

The cable 12 curves around the bolt 66 and is connected at its end to the brake activation plate 64 (FIG. 2). In the preferred embodiment, the cable 12 is attached to the brake actuation plate 64 by means of a ring connector 80 which is mounted to the plate 64 by means of a nut 82 and a bolt 84, but the cable 12 may, of course, be attached to the trailer braking system 14 by any practical connection means. The brake actuation plate 64 consists of a flat, L-shaped plate with an aperture passing through each leg of the plate. The upper aperture 86 is used to connect the cable 12 to the plate 64, while the side aperture 88 is used to indirectly secure the activation plate 64 to the piston push rod 44. As the cable 12 is pulled toward the pulling vehicle, the ring connector end of the cable 12 is pulled away from the pulling vehicle thereby moving the brake actuation plate 64 into the spring 50. The spring 50 is pre-stressed with three hundred pounds of tension. As the brake actuation plate 64 is moved, force is transferred through the spring 50 and into a push plate 65 secured to the piston push rod 44. The piston push rod 44 thereby actuates the master cylinder 48. This movement of the brake actuation plate 64 actuates the trailer braking system 14 as the cable 12 is pulled toward the pulling vehicle.

FIG. 3 shows a brake bypass aperture cover 90 which prevents the brake bypass aperture 32 from allowing moisture and other elements inside the housing 22 where they may deteriorate the trailer braking system 14. Once the breakaway lock trigger mechanism 34 has been actuated, the cable 12 will not return back into the housing 22, until the spring lock 26 is released to allow the balls 18 and 20 to pass the spring lock 26. After the spring lock 26 is released, the balls 18 and 20 may bypass the spring lock 26 and return to their preactuation position.

The breakaway mechanism 10 is designed for quick and simple release (FIG. 3). To release the spring lock 26 the brake bypass aperture cover 90 is removed and a screwdriver or similar tool is inserted through the aperture 32 to engage the catch end 78 of the spring lock 26. As shown in FIG. 5, the catch end 78 of the spring lock 26 has an incurved corner 92. This incurved corner 92 allows the insertion of the brake bypass aperture cover 90 into the brake bypass aperture 32 without release of the spring lock 26 (FIGS. 3 and 5). The incurved corner 92 also allows a screwdriver or other tool to squarely engage the catch end 78 of the spring lock 26 after the tool is inserted into the housing 22 through the aperture 32.

As a screwdriver or other tool is pressed downward upon the incurved corner 92, the catch end 78 of the spring lock 26 is pushed away from the cable guide plate 28 thereby providing a space through which the balls 18 and 20 may pass by the spring lock 26 (FIGS. 2 and 5). As the catch end 78 of the spring lock 26 is pushed away from the cable guide plate 28, hydraulic pressure within the master cylinder 48 forces the cable 12 and balls 16, 18 and 20 into their preactuation position (FIG. 2). When the tool is removed, the spring action of the curved portion of the spring lock 26 forces the catch end 78 of the spring lock 26 back into engagement with the cable guide plate 28. The breakaway mechanism 10 is thereafter ready for operation. The brake bypass aperture cover 90 is returned into the brake bypass aperture 32 to prevent moisture and other materials from entering the housing 22 through the aperture 32.

In the preferred embodiment of the present invention, three balls 16, 18, and 20 are swaged to the cable (FIG. 2). The first ball 16 is an indicator ball which informs a person operating the breakaway mechanism 10 of the actuation position of the braking system 14 without the person having to look inside the housing 22. The second and third balls 18 and 20 are trigger balls which become engaged by the spring lock 26 and prevent the release of the master cylinder 48 after the trailer braking system 14 has been actuated and the S-hook 30 has failed. The plurality of balls 18 and 20 allows the braking mechanism 10 to be adjusted for various braking systems.

A cable well 94 is provided in the housing 22 which provides a trough in which the cable 12 and indicator ball 16 may rest (FIG. 1). The cable well 94 also prevents undue wear on other parts of the housing 22 which might result from the cable 12 being drawn back and forth across the housing 22. FIG. 1 shows the breakaway mechanism 10 in the nonactuation position where only the first ball 16 can be seen in the cable well 94. The presence of a single ball 16 at the housing aperture 24 informs a person operating the breakaway mechanism 10 that the breakaway mechanism 10 is in the nonactuation position. This nonactuation position is also shown in cutaway in FIGS. 2 and 4. If the ball 18 has been moved out of the housing aperture 24, as depicted in FIG. 3, this condition alerts a person operating the breakaway mechanism 10 that the mechanism 10 is in the actuation position and that the trailer should not be moved until the spring lock 26 is released and the cable 12 is returned to the nonactuation position. Although the preferred embodiment of the present invention is depicted with three balls 16, 18, and 20 swaged to the cable 12, only one ball or similar type flange need be provided to engage the spring lock 26. Conversely, a plurality of balls or flanges may be attached to the cable 12 to provide various stages of actuation of the breakaway mechanism 10.

In operation, the ball-type hitch 36 is mounted onto a pulling ball 96 of a pulling vehicle (FIG. 2). The hitch locking assembly 42 is pressed downward to prevent release of the hitch 36 from the pulling ball 96. The cable 12 is checked to insure that the cable 12 is in the nonactuation position before the S-hook 30 is attached to the pulling vehicle. If the breakaway mechanism 10 is shown by the indicator ball 16 to be in the actuation position, the cable 12 is returned into the housing 22 by inserting a screwdriver into the brake bypass aperture 32 to the place the braking mechanism into the nonactuation position. The S-hook 30 should be attached to a portion of the pulling vehicle which is sturdy enough to straighten the S-hook 30 without damaging the pulling vehicle. The breakaway mechanism 10 is thereafter ready for operation.

Under ideal conditions, the breakaway mechanism 10 of the present invention should never actuate the trailer braking system 14 (FIG. 2). Should, however, the hitch 36 disengage from the pulling ball 96 due to extremely rough road conditions, misengagement of the hitch 36 and ball 96, or for whatever reason, and if the trailer's safety chains (not shown) then fail, the breakaway mechanism 10 of the present invention will act to stop the trailer before the trailer continues down the roadway to cause further damage to itself or bystanders. Once the hitch 36 becomes disengaged from the ball 96 and the safety chains have failed, the trailer will generally tend to slow in relationship to the pulling vehicle because the trailer is not powered and therefore unable to overcome the forces of friction and wind resistance. As the trailer slows, the cable 12 remains connected to the pulling vehicle and is, therefore, pulled toward the pulling vehicle. This pulling causes the ring connector 80, attached to the end of the cable 12 to pull the brake actuation plate 64 and piston push rod 44 toward the master cylinder 48. The master cylinder 48 is actuated more and more as the piston push rod 44 is pulled further and further back by the cable 12 and brake actuation plate 64. As the master cylinder 48 is actuated, the trailer slows down thereby causing the cable 12 to extend outside of the housing 22 as far as possible. Depending on the trailer's brake system adjustment, either ball 18 or 20 may be captured by the spring lock 26 and the master cylinder 48 becomes fully actuated.

When the brake actuation plate 64 has been pulled toward the master cylinder 48 as far as possible, the S-hook 30 begins to straighten and fail. After the S-hook 30 has sufficiently straightened, the S-hook 30 releases the cable 12 from the pulling vehicle. The cable 12, however, is prevented from returning into the housing 22 and releasing the master cylinder 48 by the spring lock 26 which engages and holds either ball 18 or 20 against the cable guide 28. Because the balls 18 and 20 are swaged to the cable 12, the balls 18 and 20 prevent the cable 12 from returning to its preactuation position. The master cylinder 48, therefore, remains applied to bring the trailer to a complete stop. The person operating the pulling vehicle will likely notice that the trailer has become disengaged from the pulling vehicle and will then return to reattach the trailer to the pulling vehicle after checking that neither the trailer nor the pulling vehicle have been damaged from the disengagement. Because the trailer braking system 14 had been engaged, the indicator ball 18 will be moved out of the housing aperture 24 (FIG. 3).

To return the braking system 14 to operational status, after the cause of the disengagement has been determined and corrected, the operator removes the brake bypass aperture cover 90 and inserts a screwdriver or similar tool into the aperture 32 to engage the catch end 78 of the spring lock 26 (FIG. 3). As the catch end 78 is depressed with the tool, the ball 18 or balls 18 and 20 and the cable 12 move past the spring lock 26 to return to their preactuation position. The brake bypass aperture cover 90 is reinserted into the aperture 32 and the failed S-hook 30 is replaced with a new hook 30. The hitch 36 is placed back on the pulling ball 96 and the cable 12 is reattached to the pulling vehicle. The breakaway mechanism 10 is thereafter again ready for operation.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, it should be clear that the breakaway mechanism 10 may be operated without a surge actuation feature or that the breakaway mechanism 10 may be modified to actuate various types of available trailer brakes.

I claim:

1. A trailer braking mechanism which activates a trailer brake when a trailer becomes detached from a pulling vehicle comprising:
   (a) a means for releasably connecting the pulling vehicle to a trailer brake;
   (b) at least one flange operably connected to said releasable connection means;
   (c) a flange arrestment means for allowing said releasable connection means to pass by said flange arrestment means in both directions and for allowing said flange to pass across said flange arrestment means in only a single direction;
   (d) means for moving said releasable connection means and said flange across said flange arrestment means when the trailer moves away from the pulling vehicle; and
   (e) an operable connection between said releasable connection means and said trailer brake so that as the trailer moves away from the pulling vehicle, the trailer brake is actuated.

2. The braking mechanism of claim 1, wherein said releasable connection means releases from the pulling vehicle when the trailer moves away from the pulling vehicle.

3. The braking mechanism of claim 1, further comprising a housing means which encloses said trailer brake and said flange arrestment means.

4. The bring mechanism of claim 3, further comprising means to bypass said flange arrestment means so that said trailer brake may be released after said trailer brake has been actuated wherein said bypass means are located within said housing means.

5. The braking mechanism of claim 1, further comprising a surge actuation assembly which actuates said trailer brake when the speed of the trailer becomes greater than the speed of the pulling vehicle.

6. A trailer braking mechanism which activates a trailer brake when a trailer becomes detached from a pulling vehicle comprising:
   (a) a cable operably connecting the trailer to the pulling vehicle;
   (b) means for releasably attaching said cable to the pulling vehicle;
   (c) means for operably connecting said cable to the trailer brake which causes said cable to actuate the trailer brake when force is applied to said cable;
   (d) at least one flange connected to said cable between the pulling vehicle and the brake mechanism;
   (e) flange arrestment means for allowing back and forth movement of said cable across said flange arrestment means, said flange being able to pass across said arrestment means as said cable is actuating the trailer brake, and for preventing said flange from returning past said flange arrestment means when force on said cable is released;
   (f) means to bypass said flange arrestment means to allow said flange to return past said flange arrestment means; and (g) housing means to enclose the trailer brake and said flange arrestment means.

7. A braking mechanism as described in claim 6, wherein said flange comprises a metal ball swaged to said cable.

8. A braking mechanism as described in claim 6, wherein said flange arrestment means comprises:

(a) a flange engagement means which allows said cable to pass by said flange engagement means in both directions yet allows said flange to pass said flange engagement means in one direction only;

(b) means for trapping said flange against said flange engagement means;

(c) a flange guide means for maintaining said cable between said flange engagement means and said flange trapping means;

(d) recoil means for returning said flange engagement means into contact with said cable when said flange engagement means becomes disengaged from said cable; and (e) securement means for attaching said flange arrestment means to said housing means.

9. A braking mechanism as described in claim 6, wherein said releasable cable attachment means comprises an S-hook.

10. A braking mechanism as described in claim 9, wherein said S-hook is designed to straighten under pressure to disconnect said cable from the pulling vehicle.

11. A braking mechanism as described in claim 6, wherein said flange comprises a metal sphere swaged to said cable through a diameter of said sphere.

12. A braking mechanism as described in claim 6, further comprising an indicator means operably connected to said cable indicating whether the braking mechanism has been actuated.

13. A braking mechanism as described in claim 6, wherein said indicator means comprises a metal sphere swaged to said cable through a diameter of said sphere.

14. A braking mechanism as described in claim 6, wherein said bypass means is located within said housing means and is accessible by an aperture in said housing means through which a tool may be inserted to engage said bypass means, wherein said bypass means comprises a portion of said flange arrestment means engageable by said tool to release said flange and return said braking mechanism to a preactuation state.

15. A braking mechanism as described in claim 6, wherein said flange arrestment means comprises a curved metal plate of a generally rectangular shape secured on one end in a fixed relationship relative to a means for trapping said flange against said flange arrestment means, wherein said flange arrestment means is curved so that the opposite end of said plate is forcibly engaged, by means of the spring action of the metal, to said trapping means said plate having an aperture near said secured end through which said cable and said flange may pass, said engagement end of said plate contacting said trapping means at an angle less than 90° so that said cable may pass back and forth across said engagement end of said plate while said flange may only pass across said engagement end of said plate in a single direction.

* * * * *